(12) United States Patent
Schlipf et al.

(10) Patent No.: US 8,307,860 B2
(45) Date of Patent: Nov. 13, 2012

(54) DEVICE FOR EVENLY FILLING OR EMPTYING DOSING CHAMBERS

(75) Inventors: Jens Schlipf, Freiberg A. N. (DE); Ralf Schmied, Freiberg (DE); Walter Boehringer, Remshalden (DE); Thomas Franck, Lorch-Weitmars (DE)

(73) Assignee: Robert Bosch GmbH, Stuttgart (DE)

( * ) Notice: Subject to any disclaimer, the term of this patent is extended or adjusted under 35 U.S.C. 154(b) by 922 days.

(21) Appl. No.: 12/093,978

(22) PCT Filed: Nov. 14, 2006

(86) PCT No.: PCT/EP2006/068431
§ 371 (c)(1),
(2), (4) Date: May 16, 2008

(87) PCT Pub. No.: WO2007/057386
PCT Pub. Date: May 24, 2007

(65) Prior Publication Data
US 2009/0044490 A1    Feb. 19, 2009

(30) Foreign Application Priority Data

Nov. 18, 2005  (DE) .......................... 10 2005 055 056
Jan. 4, 2006   (DE) .......................... 10 2006 000 748

(51) Int. Cl.
- *B65B 1/04*    (2006.01)
- *B65B 3/04*    (2006.01)
- *B65B 37/00*   (2006.01)
- *B67C 3/00*    (2006.01)

(52) U.S. Cl. .............. 141/18; 141/2; 141/125; 141/242; 141/280; 53/273

(58) Field of Classification Search .............. 141/2, 144, 141/145, 178, 238, 242, 244, 18, 125, 280; 53/267, 268, 273, 510, 511, 512
See application file for complete search history.

(56) References Cited

U.S. PATENT DOCUMENTS

| | | | | |
|---|---|---|---|---|
| 4,371,014 A * | 2/1983 | Cane | ............................... | 141/91 |
| 5,826,633 A * | 10/1998 | Parks et al. | ..................... | 141/18 |
| 6,286,567 B1 | 9/2001 | Runft | | |
| 6,357,490 B1 * | 3/2002 | Johnston et al. | .................. | 141/2 |
| 7,392,636 B2 * | 7/2008 | Conti | ............................... | 53/433 |
| 2002/0088207 A1 | 7/2002 | Johnston et al. | | |

FOREIGN PATENT DOCUMENTS

DE         43 43 317 A1    6/1995
(Continued)

*Primary Examiner* — Len Tran
*Assistant Examiner* — Ryan Reis
(74) *Attorney, Agent, or Firm* — Michael Best & Friedrich LLP

(57) ABSTRACT

Disclosed is a device for evenly filling or emptying at least one dosing chamber with a product. The device includes a dosing chamber disposed in a dosing disk, the product being dispensed into or emptied from the dosing chamber. A pressure generator impinges the dosing chamber with a predetermined pressure in order fill or empty the dosing chamber. A filter is disposed movably relative to the dosing chamber to assures that once the product has been dispensed, the product can be brought downward into the container to be filled. The filling of the container can be reinforcing by blown air or by transfer dies. The dosing chamber communicates, via the filter means, with the pressure generator. By application of an underpressure, the product to be dosed is dispensed into the dosing chamber. For cleaning the filter means, on the other hand, an overpressure pulse is applied, which improves product dispensing precision.

12 Claims, 3 Drawing Sheets

FOREIGN PATENT DOCUMENTS

| | | |
|---|---|---|
| DE | 197 43 088 A1 | 4/1999 |
| DE | 20 2004 007 431 U1 | 8/2004 |
| WO | WO 83/02434 A1 | 7/1983 |
| WO | WO 02/15839 A2 | 2/2002 |

* cited by examiner

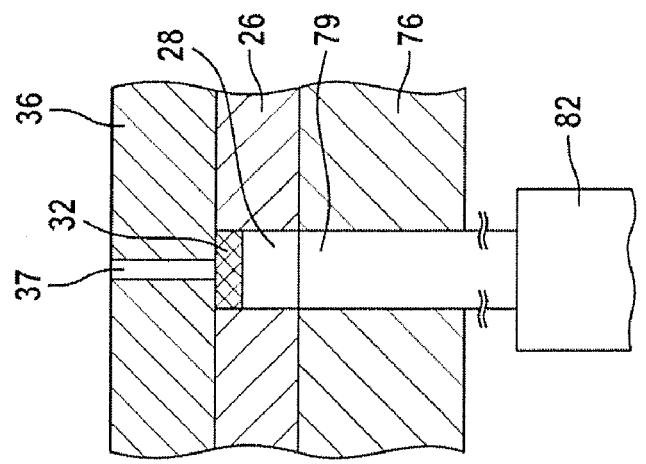
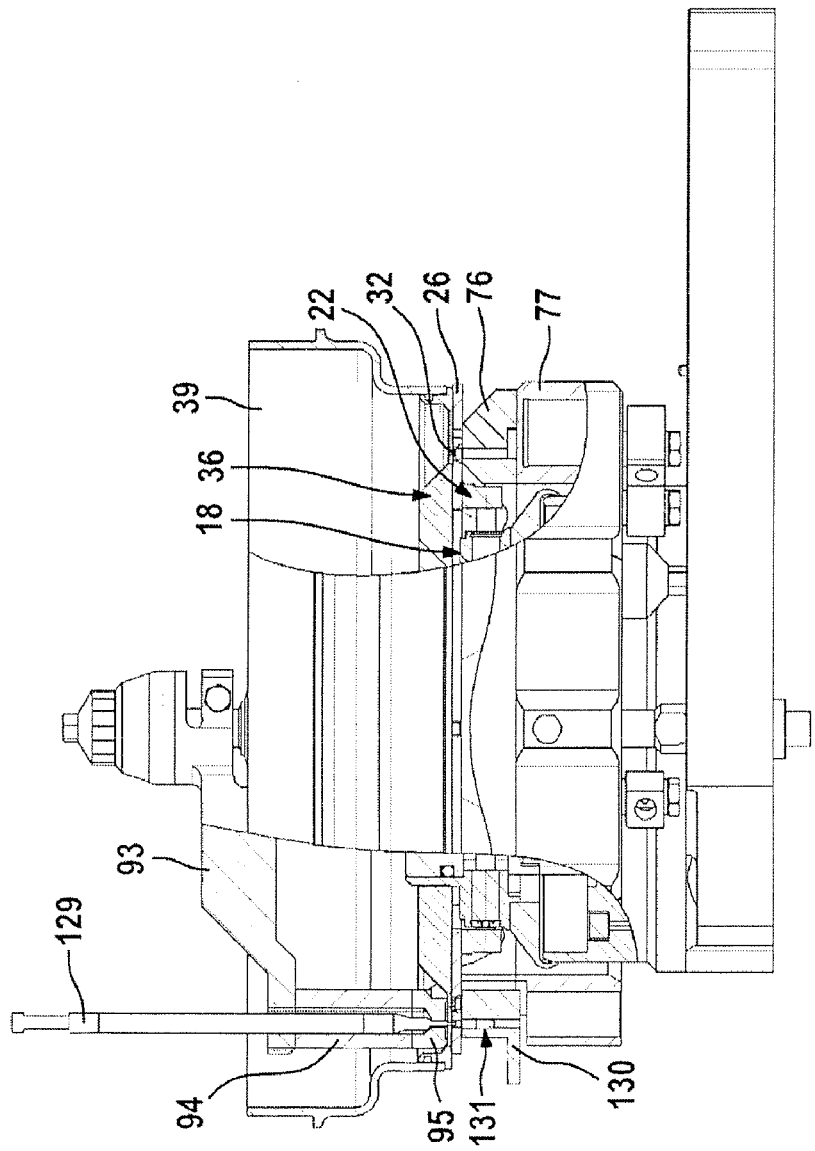
Fig. 4
Fig. 3

DEVICE FOR EVENLY FILLING OR EMPTYING DOSING CHAMBERS

CROSS-REFERENCE TO RELATED APPLICATION

This application is a 35 USC 371 application of PCT/EP 2006/068431 filed on Nov. 14, 2006.

BACKGROUND OF THE INVENTION

1. Field of the Invention

The invention is based on a device for evenly filling or emptying dosing chambers.

2. Description of the Prior Art

From German Patent Disclosure DE 197 43 0888 A1, a dosing device is already known. It comprises a revolving dosing disk, with dosing chambers disposed as openings in groups over part of a circle. To close the lower opening in the dosing chambers, slides with openings are supported displaceably on the underside of the dosing disk that in the filling position close the dosing chambers and in the emptying position open them. The slides are pressed into the emptying position by a sliding block piece that is retained in the filling position and by a controlled lever. The product to be metered out and dispensed is fed onto the upper side of the dosing disk, and from there by means of stuffing dies is stuffed into the dosing chambers of the dosing disk as the dosing disk revolves, the slides being in their closing position. Particularly when the quantities to be dosed are small, homogeneous filling is difficult. So-called product bridges can develop.

It is the object of the invention to overcome the aforementioned disadvantages or at least reduce them. This object is attained by the characteristics of the independent claim.

SUMMARY AND ADVANTAGES OF THE INVENTION

The device according to the invention has the advantage that the product to be dosed is aspirated homogeneously into the dosing chambers, for instance through vacuum bores. It thus becomes possible for very small dosing chambers to be filled homogeneously with powder or pellets without forming product bridges. Small quantities can be dosed quite precisely without forming a solid powder compact.

In an expedient refinement, it is provided that a filter means is disposed movably relative to the dosing chamber. This assures that once the metering has been accomplished, the product can be brought downward into the container to be filled. The filling is also reinforced by gravity. Expediently, the filling can be reinforcing by blown air or by transfer dies.

In an expedient refinement, it is provided that the dosing chamber can be made to communicate, via the filter means, with at least one underpressure or overpressure generator. By application of an underpressure, the product to be dosed is put in the dosing chamber. For cleaning the filter means, on the other hand, an overpressure pulse can also be applied, which improves the metering precision. This prevents clogging of the pores of the filter, so that for ensuing dosing operations as well, the dosing chamber can be reliably subjected to underpressure.

In an expedient refinement, it is provided that a plurality of dosing chambers are covered on their undersides by a filter, and the filter is disposed in a recess that can be subjected to underpressure or overpressure. This simplifies the structural shape of the dosing device, and a plurality of product portions can be dosed at the same time.

In an expedient refinement, it is provided that the filled dosing chamber be transferred by means of a compressed air pulse or by transfer dies into the lower part of the capsule. This speeds up the filling operation. No product remains in the dosing chamber that is to be emptied.

Further expedient refinements will become apparent from the description.

BRIEF DESCRIPTION OF THE DRAWINGS

The exemplary embodiments of the invention are shown in the drawings and described in further detail below, in which:

FIG. 3 is a further sectional view through the dosing device;

FIG. 4 shows a detail of FIG. 3; and

DESCRIPTION OF THE PREFERRED EMBODIMENTS

Figure 2:
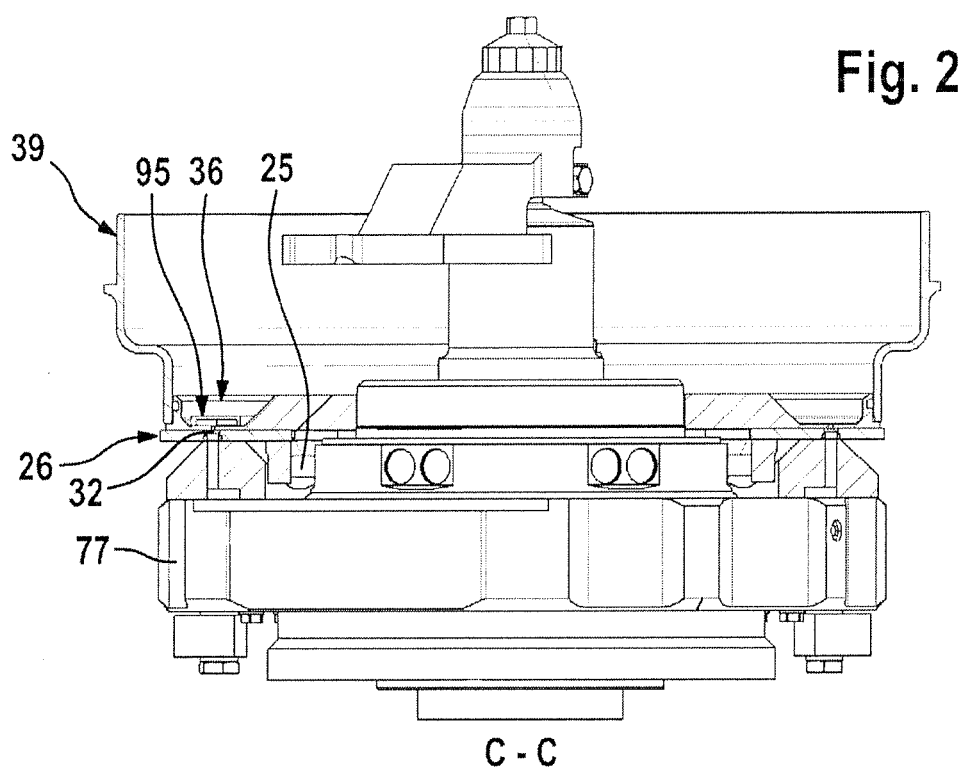
FIG. 2 is a sectional view through the dosing device taken along the section C-C.
Figure 1:
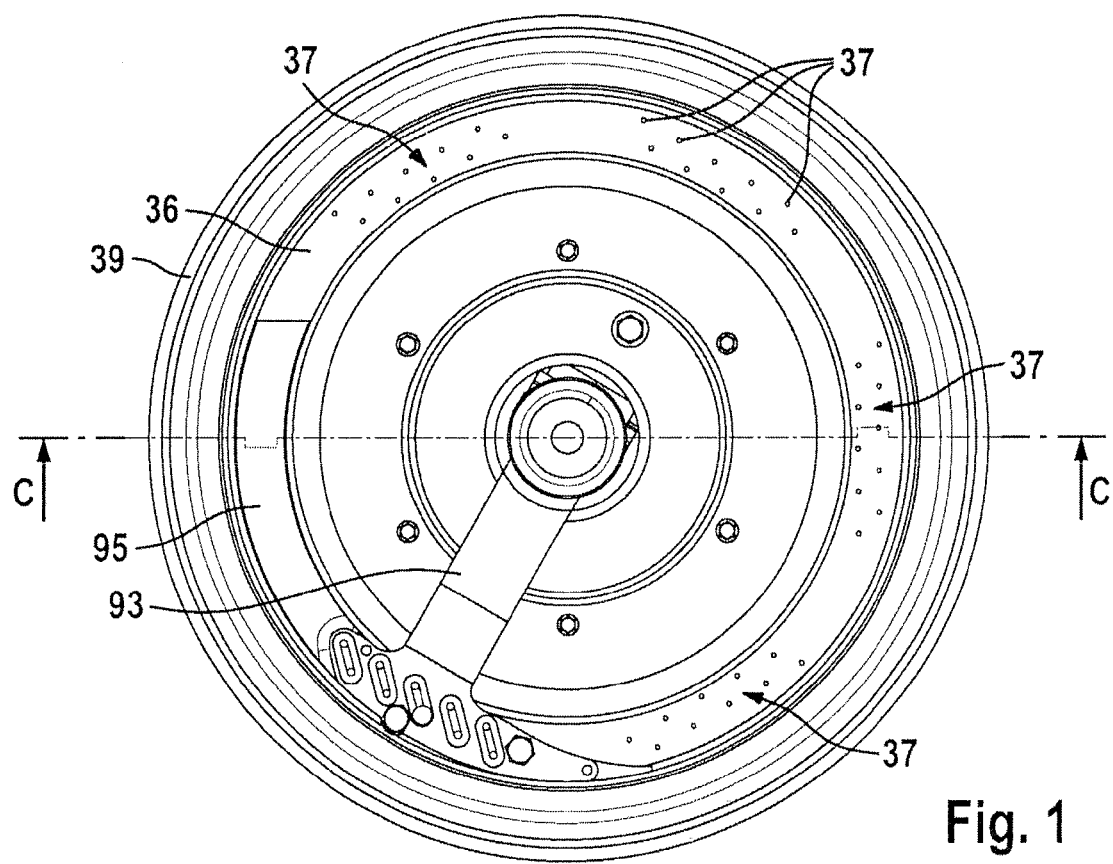
FIG. 1 shows a plan view on a dosing disk.

The device shown for evenly filling or emptying dosing chambers is used in particular to dose small quantities of a product such as medical powders, granulates and similar bulk products and for filling preferably hard gelatin capsules with them. A dosing disk 36 is bounded by an encompassing rim 39. A series of dosing chambers 37 is disposed on the bottom of the dosing disk 36. The product to be dosed is placed in the chamber formed by the rim 39 and the underside of the dosing disk 36. The dosing disk 36 is secured to a vertical shaft, not identified by reference numeral, and is rotated in increments by a defined angle each. Via a retaining arm 93, a curved scraper or stripper 95 is secured; it is stationary relative to the dosing disk 36. The location of the stripper 95 can also be seen in FIG. 2. Below the dosing disk 36, a slide 26 is disposed movably relative to the dosing disk 36. The slide 26 is provided with one or more slide bores 28, on the upper side of which a filter system 32 is disposed. In the filling position shown, the filter system 32 is immediately below at least one dosing chamber 37. In the filling position, by means of an overpressure or underpressure generator 82, an underpressure can be generated in the at least one dosing chamber 37 via a bearing ring bore 79 of a bearing ring 76 and the slide bore 28 and the filter system 32. The transfer position is shown on the left-hand side of FIG. 3. A transfer die 129 feeds the quantity of dosed product located in the dosing chamber 37 into a lower capsule part 131 that stands ready in a segment 130 for receiving the product. A flange 18 forms a guide for the slide 26. The slide 26 is held by the slide holder 22.

The device for evenly filling or emptying dosing chambers 37 functions as follows: The dosing chambers 37 are preferably embodied as bores in the dosing disk 36. The diameter and depth of the bore and the thickness of the dosing disk 36 define the quantity to be dosed. The filter system 32 is flush with the surface of the slide 26. It is essential that via the slide bore 28 and the filter system 32, for instance, a vacuum can be applied to the dosing chamber 37 or an overpressure can be generated so that the product be dosed can be introduced into the dosing chamber 37. In the exemplary embodiment, this is done for example by means of the underpressure generator 82. The product to be dosed, such as powder, is moved in a circle in a powder cup in the dosing disk 36 by rotary motions, which under some circumstances are moved in increments. The dosing disk 36, which has a plurality of bores acting as dosing chambers 37, forms the bottom of the cup. In the dosing position, the filter system 32 is located below the dosing chambers 37 that are to be filled. In addition, the slide 26 rests flatly on the bearing ring 76, so that the bearing ring bores 79 and the slide bores 28, with the filter system 32 disposed there, and the dosing chambers 37 are aligned with one another. In the first step, a vacuum is now applied to the dosing chambers 37. As a result, the powder is aspirated into the dosing chambers 37. This can optionally be repeated multiple times. In the next step, the excess powder, as an example of a product on the dosing disk surface that is to be dosed, is cleanly scraped off by the stripper 95. The slide 26 moves toward the center of the device and aligns the transfer bores of the slide with those of the dosing disk 36. As a result, the transfer die 129 can transfer the powder volume that is not already dropped by gravity into the lower part 131 of the capsule completely securely out of the dosing disk 36 in a straight line downward. In addition, the powder to be dispensed can be taken out of the dosing chamber 37 and introduced into the lower part 131 of the capsule by means of a compressed air pulse, as is made possible by the device shown in FIG. 5. In the next step, the slide 26 is closed again; that is, the transfer bores are no longer in alignment with the dosing chambers 37. The dosing disk 36 rotates onward with the slide 26 under the stripper 95 by one increment, for instance one-sixth, so that there the extremely fine product located in the filter pores of the filter system 32 can be blown out again. This is done by exerting an overpressure on the filter system 32 via bores 79, 28. By means of this cleaning cycle, clogging of the pores of the filter system 32 over a long period of time is prevented. Moreover, an advantage of the method is that the blown-out product is not waste but instead can be returned to the product stream.

Figure 5:
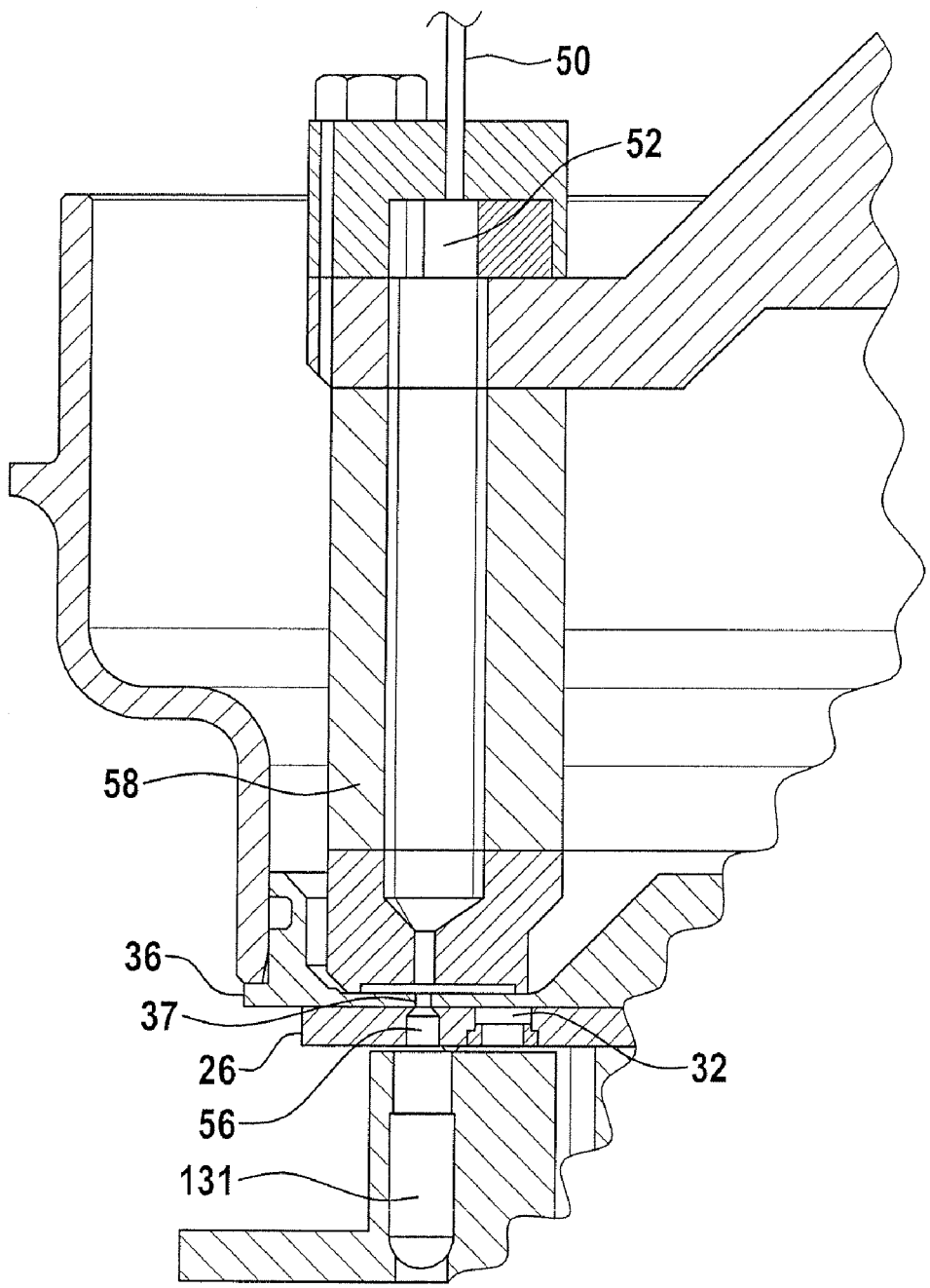
FIG. 5 shows an alternative exemplary embodiment for blowing out the transfer bore.

In the second exemplary embodiment of FIG. 5, a compressed air connection 50 is provided, by way of which compressed air can be introduced into a compressed air chamber 52. This compressed air chamber 52 is integrated with a scraper or stripper 58 of this second embodiment, in such a way that one or more compressed air pulses can be introduced into the powder-filled dosing chamber 37 to empty the power located there into the lower part 131, disposed below it of the capsule via the transfer bore 56. The transfer bore 56 is in turn disposed in the movable slide 26, as is the filter system 32.

The exemplary embodiment of FIG. 5 serves the purpose of targeted emptying of a filled dosing chamber 37. Via the compressed air connection 50, compressed air is delivered to the compressed air chamber 52, located in the stripper 58, continuously or in pulses. If the slide 26 is then in the transfer position (the transfer bore 56 is located between the do sing chamber 37 and the lower part 131 of the capsule), then the powder located in the dosing chamber 37 is blown out by the pressure exerted and drops through the transfer bore 56 into the lower capsule part 131 that is ready to be filled that is in readiness. As a result, the dosing chamber 37 is completely emptied; no product residues remain.

Various embodiments are conceivable. For instance, a separate filter 32, which completely covers the underside of the dosing chamber 37, may be provided for each dosing chamber. It would be equally conceivable to provide a recess in the slide 26, in such a way that the recess covers a group of the dosing chambers 37. This recess can be subjected to underpressure by the underpressure generator 82. If the slide 26 is moved into the dosing position, then the filters 32 cover the dosing chambers 37. If the vacuum is then applied to the recess, the product to be dosed is aspirated into the dosing chambers 37. The complexity of the dosing device is reduced by the provision of only a single recess.

The filter system 32 must be designed such that on the one hand, it allows the dosing chamber 37 to be subjected to underpressure. On the other, it must reliably trap the product to be metered in the dosing chamber 37 and prevent it from reaching the slide bore 28. Preferably, the filter system 32 will be disposed on the underside of the dosing chamber 37. In that case, for simple removal of the dosed product, the filter system 32 would have to be embodied movably, to enable the product to drop downward. However, a construction is also conceivable in which the filter system 32 is laterally integrated with the wall and the dosing chamber 37, particularly in the lower region, so as to aspirate the product. In that case, the movability of the filter system 32 could be dispensed with.

The foregoing relates to the preferred exemplary embodiment of the invention, it being understood that other variants and embodiments thereof are possible within the spirit and scope of the invention, the latter being defined by the appended claims.

The invention claimed is:

1. A device for consistently filling or emptying at least one dosing chamber with a product being dispensed into or emptied therefrom, comprising:
    at least one dosing chamber disposed in a dosing disk, which dosing disk has a center, is mounted in a generally horizontal orientation, and is incrementally rotated around its center about a generally vertical axis, the product being dispensed into said at least one dosing chamber and emptied therefrom, with both of the dispensing and emptying actions taking place along lines which are substantially parallel to said axis of rotation; and
    a pressure generating means provided for subjecting the at least one dosing chamber to a defined pressure for filling or emptying the at least one dosing chamber,
    further comprising at least one filter means disposed between the at least one dosing chamber and the pressure generating means, wherein the at least one dosing chamber is subjected to a defined pressure through the filter means,
    wherein the filter means is disposed in a slide, wherein the slide is disposed movably relative to the dosing disk, such movement being parallel to the dosing disk,
    wherein an overpressure acts on the filter means thereby cleaning the filter means, the overpressure being generated by the pressure generating means.

2. The device according to claim 1, further comprising a slide bore provided in the slide, wherein the filter means are disposed in the slide bore.

3. The device according to claim 1, wherein the slide has at least one transfer bore, through which the product reaches a container, such as a lower part of a capsule.

4. A device for consistently filling or emptying at least one dosing chamber with a product being dispensed into or emptied therefrom, comprising:
    at least one dosing chamber disposed in a dosing disk, the dosing disk having a center, is mounted in a generally horizontal orientation, and is rotatable about a substantially vertical axis, the product being dispensed into said dosing chamber and emptied therefrom, with both of the dispensing and emptying actions taking place along lines which are substantially parallel to the axis of rotation,
    a pressure generating means provided for subjecting the at least one dosing chamber to a defined pressure for filling or emptying the at least one dosing chamber,
    further comprising at least one filter means disposed between the at least one dosing chamber and the pressure generating means, wherein the at least one dosing chamber is subjected to a defined pressure through the filter means, wherein the filter means is disposed movably relative to the at least one dosing chamber in a direction which is substantially parallel to the dosing disk, wherein an overpressure acts on the filter means thereby cleaning the filter means, the overpressure being generated by the pressure generating means.

5. The device according to claim 4, wherein the filter means is disposed on an underside of the at least one dosing chamber.

6. The device according to claim 5, wherein the filter means is disposed in a slide, wherein the slide is disposed movably relative to the dosing disk.

7. The device according to claim 6, further comprising a slide bore provided in the slide, wherein the filter means are disposed in the slide bore.

8. The device according to claim 7, wherein the slide bore is embodied as a transfer bore through which the product reaches a container, such as a lower part of a capsule.

9. The device according to claim 8, wherein a plurality of dosing chambers are disposed in the dosing disk, the at least one dosing chambers being covered by one or more filter means.

10. The device according to claim 4, wherein a plurality of dosing chambers are disposed in the dosing disk, the at least one dosing chambers being covered on an underside thereof by one or more filter means, wherein the filter means are disposed in a recess in the slide, which recess can be subjected to underpressure or overpressure.

11. The device according to claim 4, further comprising a compressed air chamber, the at least one dosing chamber being subjected to a defined pressure via the compressed air chamber.

12. A device for consistently filling or emptying at least one dosing chamber with a product being dispensed into or emptied therefrom, comprising:

at least one dosing chamber disposed in a dosing disk, the dosing disk has a center, is mounted in a generally horizontal orientation, and is rotatable about a generally vertical axis, the product being dispensed or emptied into said dosing chamber, with both the dispensing and emptying actions taking place along lines which are substantially parallel to said axis of rotation; and further comprising at least one filter means disposed between the at least one dosing chamber and the pressure generating means, wherein the at least one dosing chamber is subjected to a defined pressure through the filter means, wherein the filter means is disposed in a slide, wherein the slide is disposed movably relative to the dosing disk in a direction which is substantially parallel to the dosing disk, a pressure generating means provided for subjecting the at least one dosing chamber to a defined pressure for filling or emptying the at least one dosing chamber, wherein an overpressure acts on the filter means thereby cleaning the filter means, the overpressure being generated by the pressure generating means, further comprising a compressed air chamber, the at least one dosing chamber being subjected to a defined pressure via the compressed air chamber, and wherein the compressed air chamber is disposed in a product stripper.

\* \* \* \* \*